United States Patent
Yanobe

(10) Patent No.: US 10,386,485 B2
(45) Date of Patent: Aug. 20, 2019

(54) LASER SCANNER

(71) Applicant: TOPCON Corporation, Tokyo-to (JP)

(72) Inventor: Satoshi Yanobe, Tokyo-to (JP)

(73) Assignee: TOPCON Corporation, Tokyo-to (JP)

(*) Notice: Subject to any disclaimer, the term of this patent is extended or adjusted under 35 U.S.C. 154(b) by 342 days.

(21) Appl. No.: 15/358,359

(22) Filed: Nov. 22, 2016

(65) Prior Publication Data

US 2017/0160383 A1 Jun. 8, 2017

(30) Foreign Application Priority Data

Dec. 2, 2015 (JP) .................... 2015-236020

(51) Int. Cl.
| | |
|---|---|
| *G01C 3/08* | (2006.01) |
| *G01S 17/10* | (2006.01) |
| *G01S 17/42* | (2006.01) |
| *G01S 7/487* | (2006.01) |

(52) U.S. Cl.
CPC ............ *G01S 17/10* (2013.01); *G01S 7/4873* (2013.01); *G01S 17/42* (2013.01)

(58) Field of Classification Search
CPC ......... G01S 17/10; G01S 7/4873; G01S 17/42
See application file for complete search history.

(56) References Cited

U.S. PATENT DOCUMENTS

| 6,493,067 B1 | 12/2002 | Kodaira et al. |
| 2012/0105824 A1 | 5/2012 | Ohtomo et al. |
| 2013/0010278 A1* | 1/2013 | Ohmuro ............... G01S 17/10 356/4.01 |
| 2016/0084651 A1* | 3/2016 | Hinderling ............ H01L 31/10 356/4.01 |
| 2016/0103001 A1 | 4/2016 | Yanobe et al. |

FOREIGN PATENT DOCUMENTS

| JP | 60-157014 A | 8/1985 |
| JP | 2000-193454 A | 7/2000 |
| JP | 2012-93245 A | 5/2012 |
| JP | 2016-75607 A | 5/2016 |

\* cited by examiner

*Primary Examiner* — Samantha K Abraham
(74) *Attorney, Agent, or Firm* — Nields, Lemack & Frame, LLC

(57) ABSTRACT

The invention provides a laser scanner, which comprises a light projecting unit for irradiating a distance measuring light, a light receiving unit for receiving a reflected distance measuring light, a distance measuring unit for performing a distance measurement based on a light receiving signal, a rotary deflecting unit for performing a rotary irradiation of the distance measuring light, and an arithmetic control unit, wherein the arithmetic control unit has a light receiving intensity judging component and a threshold value setting component, a light receiving intensity which is obtained by scanning the distance measuring light is inputted in advance to the threshold value setting component from the light receiving intensity judging component, the threshold value setting component sets a threshold value for detecting light receiving corresponding to the light receiving intensity, and the arithmetic control unit acquires a light receiving signal based on the threshold value and performs a distance measurement.

2 Claims, 5 Drawing Sheets

LASER SCANNER

BACKGROUND OF THE INVENTION

The present invention relates to a laser scanner, which acquires point cloud data of a predetermined range or point cloud data of an object to be measured by scanning a distance measuring light.

In a laser scanner, point cloud data of a predetermined range or an object to be measured is acquired by irradiating a pulsed light as a distance measuring light and by rotating the distance measuring light in a horizontal direction while performing rotary scanning at a constant speed in a vertical direction. The laser scanner performs a distance measurement by receiving a reflected distance measuring light for each pulse, also measures a vertical angle and a horizontal angle at the time of the distance measurement, and acquires three-dimensional data of each irradiated point (i.e. a measuring point).

A light receiving intensity of the reflected distance measuring light is under strong influence due to a measurement distance, and also, due to a condition of a surface where a distance measuring light is irradiated. Further, the light receiving intensity exerts an influence on a measurement accuracy, and an appropriate threshold value is required for a detection as to whether or not a ht is received.

Conventionally, a threshold value to detect a light receiving is fixed during a measurement. In a case where there is a change in the light receiving intensity during the measurement, there is a case where a noise may be included in a photodetection signal and an accuracy may be decreased, or a case where the photodetection signal is not acquired with respect to the object to be measured which should be measured.

SUMMARY OF THE INVENTION

It is an object of the present invention to provide a laser scanner, in which a threshold value corresponding to a light receiving intensity is set so that an appropriate photodetection signal is acquired.

To attain the object as described above, a laser scanner according to the present invention comprises a light projecting unit for pulse-emitting a distance measuring light and for irradiating the distance measuring light, a light receiving unit for receiving a reflected distance measuring light and for producing a light receiving signal, a distance measuring unit for performing a distance measurement based on a light receiving signal from the light receiving unit, a rotary deflecting unit for deflecting the distance measuring light in a horizontal direction and for being rotated in a horizontal direction and in a vertical direction at a constant speed and for performing a rotary irradiation of the distance measuring light, encoders for detecting a rotation angle of the rotary deflecting unit, and an arithmetic control unit for controlling the distance measuring unit and the rotary deflecting unit, for scanning the distance measuring light and for calculating three-dimensional data of a measuring point based on a light receiving signal from the light receiving unit, wherein the arithmetic control unit has a light receiving intensity judging component and a threshold value setting component, a light receiving intensity which is obtained by scanning the distance measuring light is inputted in advance to the threshold value setting component from the light receiving intensity judging component, the threshold value setting component sets a threshold value for detecting light receiving corresponding to the light receiving intensity, and the arithmetic control unit acquires a light receiving signal based on the threshold value and performs a distance measurement.

Further, the laser scanner according to the present invention further comprises encoders for detecting a rotation angle and a reference position of the rotary deflecting unit, a signal processing component for converting a signal from the encoder to an angle signal of a rectangular wave and a reference signal, a clock signal generating component for issuing a clock signal, an angle counter for counting the rectangular wave from the reference signal and a clock counter for counting the clock signal, wherein an angle calculating component counts the rectangular wave and the clock signal respectively with reference to the reference signal, obtains a count number of the rectangular wave at a moment when a light receiving intensity of the reflected distance measuring light exceeds the threshold value and obtains a number of clock signal exceeding the last rectangular wave as counted, obtains a main angle by multiplying an angle pitch of the rectangular wave and a count number of the rectangular waves together, obtains an odd number angle by proportionally dividing the angle pitch based on the number of the clock signal and obtains a rotation angle of the rotary deflecting unit by adding the main angle and the odd number angle.

According to the present invention, the laser scanner comprises a light projecting unit for pulse-emitting a distance measuring light and for irradiating the distance measuring light, a light receiving unit for receiving a reflected distance measuring light and for producing a light receiving signal, a distance measuring unit for performing a distance measurement based on a light receiving signal from the light receiving unit, a rotary deflecting unit for deflecting the distance measuring light in a horizontal direction and for being rotated in a horizontal direction and in a vertical direction at a constant speed and for performing a rotary irradiation of the distance measuring light, encoders for detecting a rotation angle of the rotary deflecting unit, and an arithmetic control unit for controlling the distance measuring unit and the rotary deflecting unit, for scanning the distance measuring light and for calculating three-dimensional data of a measuring point based on a light receiving signal from the light receiving unit, wherein the arithmetic control unit has a light receiving intensity judging component and a threshold value setting component, a light receiving intensity which is obtained by scanning the distance measuring light is inputted in advance to the threshold value setting component from the light receiving intensity judging component, the threshold value setting component sets a threshold value for detecting light receiving corresponding to the light receiving intensity, and the arithmetic control unit acquires a light receiving signal based on the threshold value and performs a distance measurement. As a result, threshold value for detecting the receiving of a distance measuring light is changed corresponding to a light receiving intensity, it is possible to receive a reflected distance measuring light in a reliable manner even under a measurement circumstance where a property of a reflection surface of an object to be measured intensively varies, further, by setting to an appropriate threshold value, a noise is decreased and a measurement accuracy is improved.

Further, according to the present invention, the laser scanner further comprises encoders for detecting a rotation angle and a reference position of the rotary deflecting unit, a signal processing component for converting a signal from the encoder to an angle signal of a rectangular wave and a reference signal, a clock signal generating component for issuing a clock signal, an angle counter for counting the rectangular wave from the reference signal and a clock counter for counting the clock signal, wherein an angle calculating component counts the rectangular wave and the clock signal respectively with reference to the reference signal, obtains a count number of the rectangular wave at a moment when a light receiving intensity of the reflected distance measuring light exceeds the threshold value and obtains a count signal exceeding the last rectangular wave as counted, obtains a main angle by multiplying an angle pitch of the rectangular wave and a count number of the rectangular waves together, obtains an odd number angle by proportionally dividing the angle pitch based on the number of the clock signal and obtains a rotation angle of the rotary deflecting unit by adding the main angle and the odd number angle. As a result, it is possible to determine a rotation angle with high accuracy by a simple processing of only counting a pulse signal without performing a complicated signal processing. Further, since the processing is not a method of obtaining a phase from a plurality of waves, high accuracy can be maintained without being influenced by a deterioration of a waveform in a case where speed becomes higher.

DETAILED DESCRIPTION OF THE PREFERRED EMBODIMENT

Figure 1:
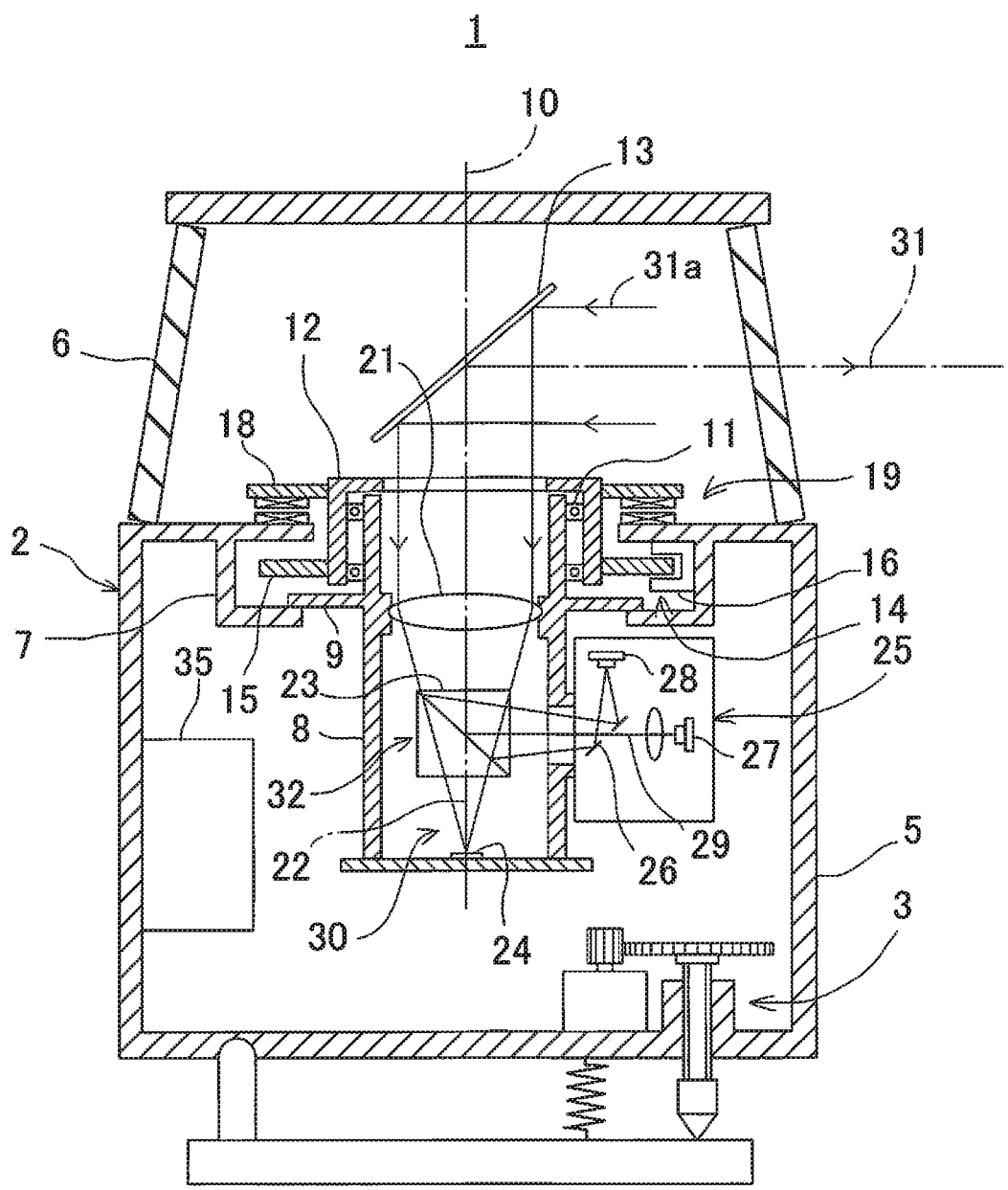
FIG. 1 is a cross-sectional view of a laser scanner according to an embodiment of the present invention.

A description will be given below on an embodiment of the present invention by referring to the attached drawings.

First, referring to FIG. 1, a description will be given on an example of a laser scanner.

A laser scanner 1 is installed at a known point via a supporting unit such as a tripod (not shown), or the like. Further, the laser scanner 1 has a measuring device main body 2 and a leveling unit 3, and the leveling unit 3 can perform a leveling of the measuring device main body 2 in a horizontal condition.

The measuring device main body 2 has a main unit case 5 and an upper case 6 to cover an upper portion of the main unit case 5. The upper case 6 has a transparent, member such as a glass, or the like over a total circumference and an irradiation of a distance measuring light is possible through the transparent member.

On an upper surface of the main unit case 5, a receiving seat 7 is provided, which forms a recessed portion, and a lens barrel 8 is provided, which penetrates the receiving seat 7 in a vertical direction. The lens barrel 8 has a flange 9 which is extended in a horizontal direction, and the lens barrel 8 is fixed at the receiving seat 7 via the flange 9.

On an upper end portion of the lens barrel 8, a rotation member 12 is provided via a bearing 11, and the rotation member 12 is rotatable with an axis 10 of the lens barrel 8 as the center. On an upper surface of the rotation member 12, a deflection mirror 13 is provided via a mirror holder (not shown). The deflection mirror 13 tilts with respect to the axis 10 and is arranged so as to be rotated integrally with the rotation member 12.

The rotation member 12 and the deflection mirror 13 deflect a distance measuring light as described later and make up together a rotary deflecting unit to perform a rotary irradiation.

Between the rotation member 12 and the receiving seat 7, a horizontal angle encoder 14 is provided as an angle detector for detecting a horizontal rotation angle.

The horizontal angle encoder 14 has a patterned circular disk 15 provided on the rotation member 12 and a detecting component 16 provided on a peripheral wall surface of the receiving seat 7, and the patterned circular disk 15 in which an angle detecting pattern is provided on a transparent circular disk by a means such as a printing. Further, the detecting component 16 has a light emitting element and a light receiving element, and it is so arranged that a detection light as emitted from the light emitting element is received by the light receiving element through the patterned circular disk 15. As the patterned circular disk 15 is rotated, the light receiving element receives the detection light corresponding to the angle detecting pattern and produces an angle detecting signal corresponding to the angle detecting pattern.

By processing this angle detecting signal, a rotation angle of the patterned circular disk 15, i.e., a rotation angle of the rotation member 12, can be detected. The angle detecting pattern as formed on the patterned circular disk 15 has a reference pattern to indicate a reference position (i.e. 0°), and a reference signal for detecting the reference pattern is outputted from the detecting component 16. The horizontal angle encoder 14 serves as an incremental encoder.

On an upper end of the rotation member 12, a rotating disk 18 is provided to face an upper surface of the main unit case 5. A horizontal motor 19 in form of a ring with the axis 10 as the center is provided between the rotating disk 18 and an upper surface of the main unit case 5, and it is so arranged that the rotation member 12 is rotated at a constant speed by the horizontal motor 19.

The deflection mirror 13 is supported so as to be rotatable in an elevation direction via a horizontal shaft (not shown). Further, the deflection mirror 13 is rotated at a constant speed by a vertical motor 20 (to be described later; see FIG. 2) via the horizontal shaft and further a rotation angle of the deflection mirror 13 is detected by a vertical angle encoder 33 (to be described later; see FIG. 2) via a rotation of the horizontal shaft. The vertical angle encoder 33 serves as an incremental encoder similarly to the horizontal angle encoder 14.

An objective lens 21 is provided inside the lens barrel 8, and an optical axis 22 of the objective lens 21 coincides with the axis 10. Under the objective lens 21 and on the optical axis 22, a dichroic mirror 23, which is a wavelength separating optical component, is provided. The dichroic mirror 23 has a reflection surface, which allows a natural light to pass through and reflects a distance measuring light (to be described later), and an image sensor 24 is provided on a transmission optical axis of the dichroic mirror 23. The objective lens 21, the dichroic mirror 23, and the image sensor 24 make up together an image pickup unit 30.

On a side surface of the lens barrel 8 and on a reflection optical axis 29 of the dichroic mirror 23, a distance measuring unit 25 is provided. A description will be given on the distance measuring unit 25.

A perforated mirror 26 is provided on the reflection optical axis 29, and a light emitting component 27 is provided on an optical axis, which passes through the perforated mirror 26. A distance measuring light receiving element 28 is provided so as to face the perforated mirror 26.

The light emitting component 27 emits a laser beam of a visible light or an invisible light or preferably, a laser beam of the invisible light as a distance measuring light by pulse emission. A distance measuring light 31 of a pulsed light as emitted passes through a hole of the perforated mirror 26 is reflected by the dichroic mirror 23 and is deflected on the optical axis 22. The distance measuring light 31 is further deflected in a horizontal direction by the deflection mirror 13 and is irradiated to an object to be measured.

A reflected distance measuring light 31a from the object to be measured is deflected on the optical axis 22 by the deflection mirror 13. Further, a reflected distance measuring light 31a is reflected by the dichroic mirror 23 and by the perforated mirror 26 and is received by the distance measuring light receiving element 28. A distance measurement is performed per each light pulse based on a photodetection signal as produced by the distance measuring light receiving element 28.

The deflection mirror 13 and the objective lens 21, the dichroic mirror 23 and the perforated mirror 26, or the like make up together an optical system 32. Further, the light emitting component 27, the dichroic mirror 23, the objective lens 21 and the deflection mirror 13 make up together a light projecting unit, and further the deflection mirror 13, the objective lens 21, the dichroic mirror 23 and the distance measuring light receiving element 28 make up together a light receiving unit.

It is to be noted that in FIG. 1, reference numeral 35 denotes an arithmetic control unit.

Figure 2:
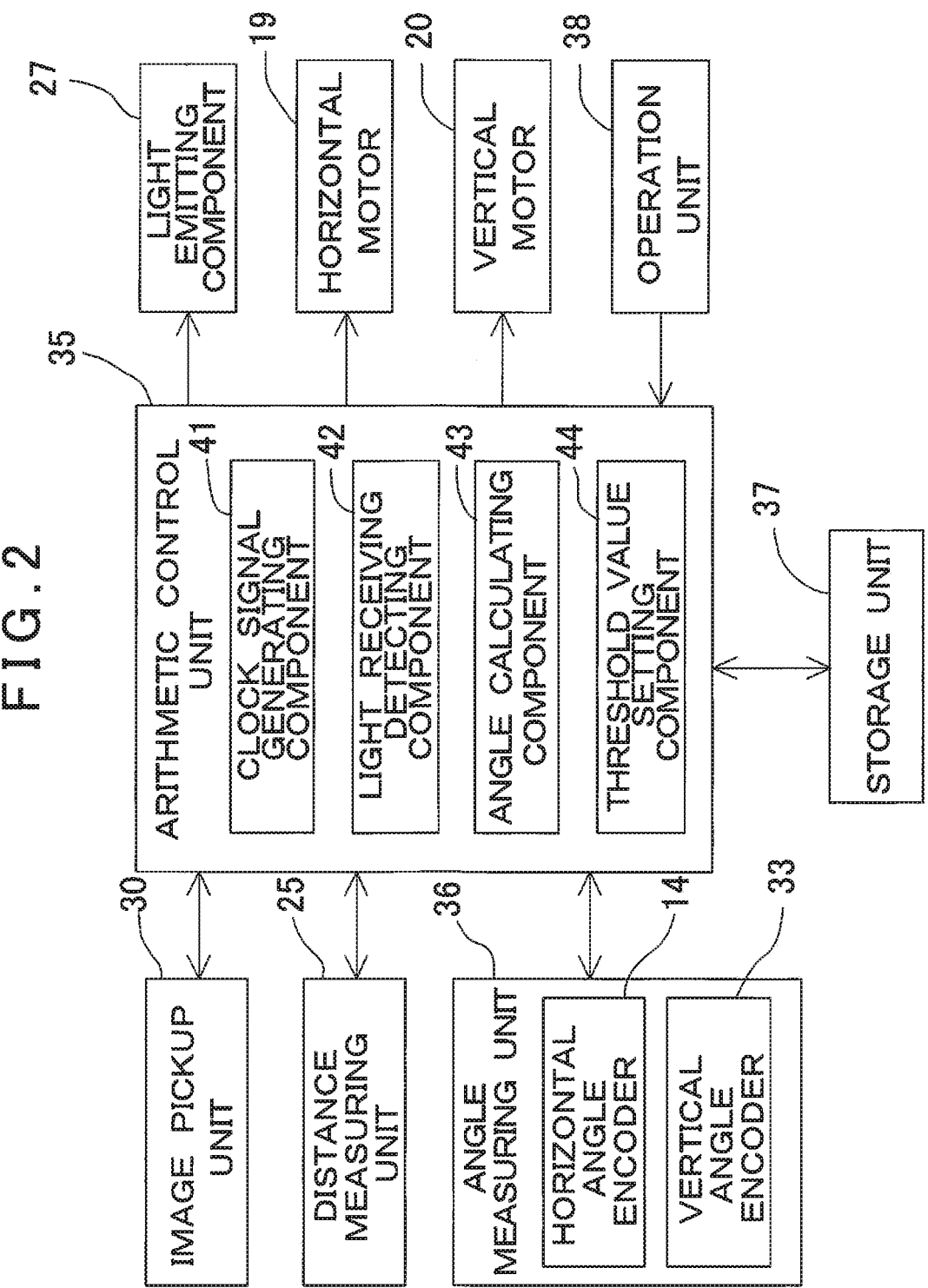
FIG. 2 is a schematical block diagram of the laser scanner.

By referring to FIG. 2, a description will be given on an approximate arrangement of the measuring device main body 2.

The measuring device main body 2 primarily comprises the horizontal motor 19, the image sensor 24, the distance measuring unit 25, the light emitting component 27, the arithmetic control unit 35, an angle measuring unit 36, a storage unit 37, an operation unit 38, or the like.

Further, the arithmetic control unit 35 includes a clock signal generating component 41, a light receiving detecting component 42, an angle calculating component 43 and a threshold value setting component 44. The angle measuring unit 36 includes the horizontal angle encoder 14 and the vertical angle encoder 33 and detects an irradiating direction (i.e. a directional angle) of the distance measuring light 31.

The storage unit 37 has a program storage region and a data storage region, and in the program storage region, following programs are stored: a sequence program for making the measuring device main body 2 execute a series of a distance measuring operation, a threshold value setting program for detecting whether or not photodetection signals are present, an image processing program for processing a signal issued from the image sensor 24 to an image signal and for storing in the storage unit 37 as image data, an angle measuring program for calculating a rotation angle based on an angle signal as inputted from the angle measuring unit 36, or the like.

The arithmetic control unit 35 performs a constant speed rotation control of the horizontal motor 19, a constant speed rotation control of the vertical motor 20 and a pulse emission control of the light emitting component 27 according to the programs such as the sequence program, the threshold value setting program, the angle measuring program, or the like, calculates a distance based on a light receiving result of the distance measuring light receiving element 28 and performs control of an image pickup by the image sensor 24, control of a detection of a rotation angle by a signal from the horizontal angle encoder 14 and the vertical angle encoder 33 and an angle measurement, or the like.

Next, a description will be given on a distance measuring operation by the laser scanner 1 as described above.

First, a threshold value setting operation is performed as a preparation for the distance measuring operation. By referring to FIG. 3, a description will be given on the threshold value setting component 44 and the threshold value setting operation.

A measuring area is set by the operation unit 38, and a trigger signal is issued to the light emitting component 27 by the arithmetic control unit 35, the light emitting component 27 is made to pulse-emit and a pulsed distance measuring light is made to scan the measurement range through the optical system 32 and the deflection mirror 13.

In a process for scanning the measurement range, a distance measuring light is reflected by an object to be measured, which is present within the measurement range, and is received by the distance measuring light receiving element 28 via the deflection mirror 13 and the optical system 32 as a reflected distance measuring light. The distance measuring light receiving element 28 produces a light receiving signal corresponding to a light receiving intensity. The light receiving signal is inputted to the threshold value setting component 44.

A light receiving intensity judging component 53 detects a peak value of a light receiving intensity of each reflected distance measuring light and inputs a detection result to the threshold value setting component 44. The light receiving intensity of the reflected distance measuring light is influenced by a distance to the object to be measured and by a property of a reflection surface. For instance, in a case where the object to be measured is a white wall, a light receiving intensity is high and in a case where the object to be measured is such a gray color or a black color, a light receiving intensity is low.

From the horizontal angle encoder 14, a horizontal angle, which is detected in synchronization with the light receiving signal by the trigger signal, is inputted to the threshold value setting component 44 by being associated with the peak value.

Similarly, from the vertical angle encoder 33, a vertical angle, which is detected in synchronization with the light receiving signal by the trigger signal, is inputted to the threshold value setting component 44 by being associated with the peak value.

The threshold value setting component 44 calculates a threshold value based on a peak value. For instance, in a case where a peak value is within a range of a value of A ±5%, a threshold value is set to 80% of a peak value A. Further, the threshold value is associated with a scanning range. For instance, if it is supposed that the scanning range where a peak value A ±5% is obtained is in a range of, e.g., a horizontal angle "a to b" and a vertical angle "n to m", a threshold value is set to 0.8 A within the range of the horizontal angle "a to b" and the vertical angle "n to m".

Then, peak values are obtained with respect to a total measurement range, and threshold values corresponding to the peak values are set. After a completion of threshold values setting operation, a distance measurement operation is performed. By the arithmetic control unit 35, the horizontal motor 19 and the vertical motor 20 are rotated uniformly at a predetermined speed respectively.

A trigger signal is issued from the arithmetic control unit 35 to the light emitting component 27, and the light emitting component 27 is made to pulse-emit and a pulsed distance measuring light is scanned in the measurement range via the optical system 32 and the deflection mirror 13.

A reflected distance measuring light as reflected by an object to be measured is received via the deflection mirror 13 and the optical system 32, and a distance to the object to be measured is calculated by detecting a light receiving (a distance measurement). Further, directional angles (i.e. a horizontal angle and a vertical angle) at a time of detecting the light receiving are obtained from the angle measuring unit 36 (an angle measurement).

Further, a threshold value, for detecting as the light receiving signal at the time of the distance measurement and the angle measurement, is the threshold value which is determined in correspondence with a light receiving intensity. Because the threshold value of the light receiving signal is set in correspondence with the light receiving intensity, a light receiving signal with less noise can be acquired. Further, even in a case where the light receiving intensity is low, the light receiving signal can be acquired in a reliable manner.

Therefore, by measuring a calculated distance and an angle of a projecting direction, three-dimensional coordinates of a measuring point can be obtained. Further, while emitting a pulsed light, the deflection mirror 13 is horizontally rotated at a constant speed by the horizontal motor 19, and further the deflection mirror 13 is rotated in a vertical direction at a constant speed by the vertical motor 20. By scanning a pulsed distance measuring light within a measurement, range, point cloud data can be acquired, which has data of a distance and data of a directional angle in the measurement range.

Figure 3:
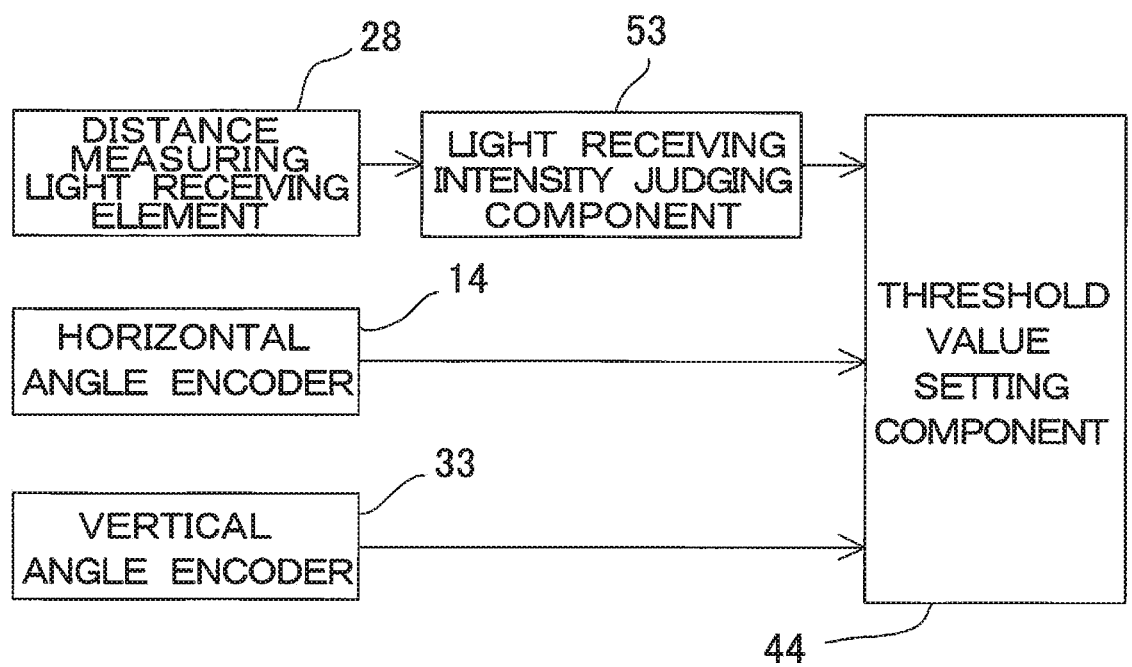
FIG. 3 is a schematical block diagram of a threshold value setting component used in the laser scanner.
Figure 4:
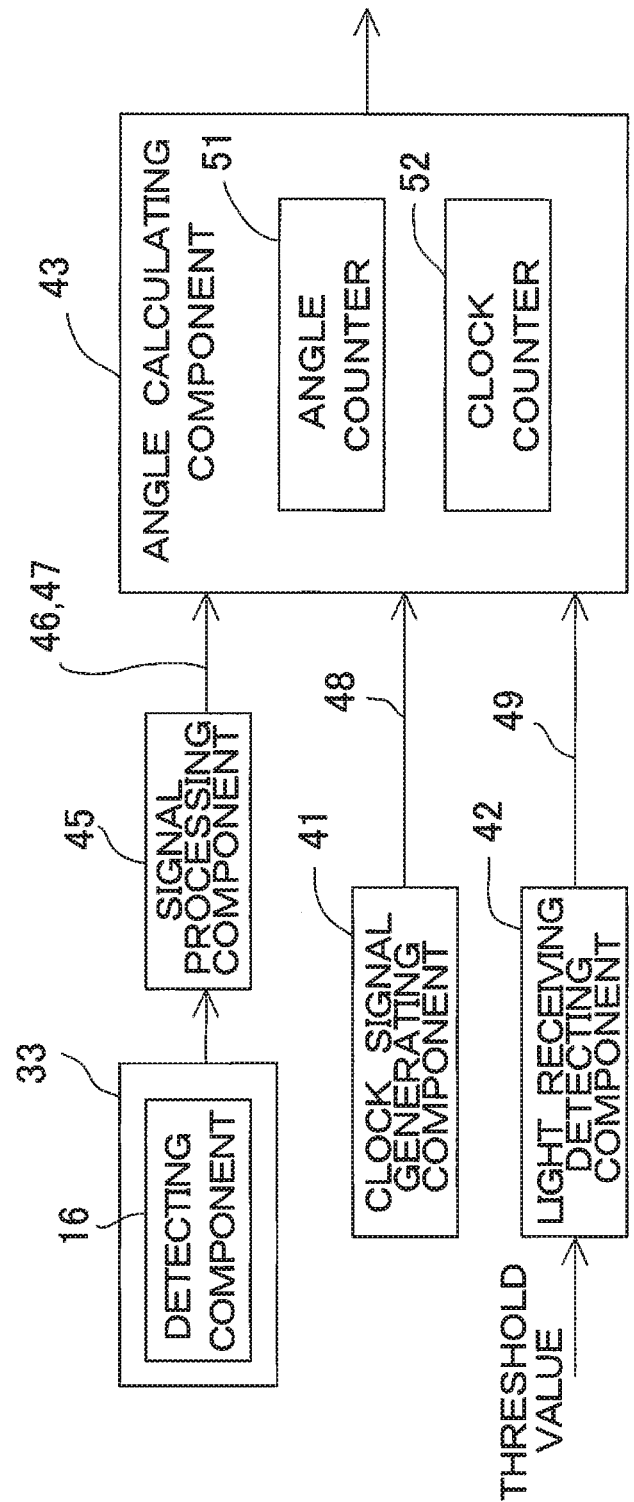
FIG. 4 is a schematical block diagram of an angle measuring unit of the laser scanner.

Next, a description will be given on the angle measuring unit 36 by referring to FIG. 3 and FIG. 4.

The angle measuring unit 36 detects a horizontal angle based on a signal as outputted from the horizontal angle encoder 14 and detects a vertical angle based on a signal as outputted from the vertical angle encoder 33. Because the horizontal angle encoder 14 and the vertical angle encoder 33 perform a similar processing, a description will be given below on the vertical angle encoder 33.

An angle detection signal is outputted to a signal processing component 45 from the detecting component 16 of the vertical angle encoder 33. The signal processing component 45 performs a signal processing on a signal from the detecting component 16 to a rectangular wave and outputs as an angle signal 46 to the angle calculating component 43. Further, the detecting component 16 also outputs a detection signal of the reference pattern and the signal processing component 45 performs a signal processing on a detection signal of the reference pattern to a rectangular wave and outputs to the angle calculating component 43 as a reference signal 47.

The angle signal 46 is, for instance, a signal which is acquired by equally dividing an angle of 360° to 10,000, and a single signal represents: 360°/10,000.

Further, a clock signal 48 from the clock signal generating component 41 is inputted to the angle calculating component 43. The light receiving detecting component 42 detects a moment when a light receiving signal exceeds a threshold value, and the moment of detection is issued to the angle calculating component 43 as a light receiving detecting signal 49.

The angle calculating component 43 has an angle counter 51 and a clock counter 52. The angle counter 51 counts the angle signal 46 from the reference signal 47, and each time the reference signal 47 is inputted (i.e. at each rotation), the angle counter 51 is set to 0. The clock counter 52 counts the clock signal 48 by using the angle signal 46 as a trigger.

Since the angle signal 46 is a signal which is acquired by diving total circumference to 10,000, an angle represented by a single angle signal (i.e. an angle pitch between angle signals) is constant. Further, an angular resolving power of 360°/10,000 is not sufficient for the measurement, and the measurement between the angle signals is performed by an interpolation method. For an angle detection by the interpolation method, the clock signal 48 is used.

Although the clock signal 48 is a signal relating to a time interval, when the deflection mirror 13 is rotated at a constant speed (i.e. a scanning speed is constant), a rotation angle between the clock signals becomes constant. Therefore, a time of one clock signal can be converted to an angle. Similarly, an angle signal can also be converted to a time.

Since the clock signal 48 is issued at a constant time interval, it is possible to equally divide a time between the angle signals 46 (i.e. a time interval between angle signals) by generation frequency of the clock signal 48, an angle per one clock signal can be obtained, and a high resolution can be achieved.

Further, by counting the angle signal 46 from the reference signal 47, a rotation angle from a reference position can be detected, and by counting a number of clock signals 48 between angle signals, an angle at an arbitrary position between angle signals can be detected with high resolution. Therefore, the rotation angel from the reference position can be obtained by adding a rotation angle obtained based on the clock signal 48 to a rotation angle obtained based on the angle signal 46. Thus, a rotation angle at an arbitrary position over a total circumference can be detected with high accuracy.

Next, a description will be given on a case where a vertical angle is obtained by using the vertical angle encoder 33 when a pulsed distance measuring light is emitted.

Figure 5A:
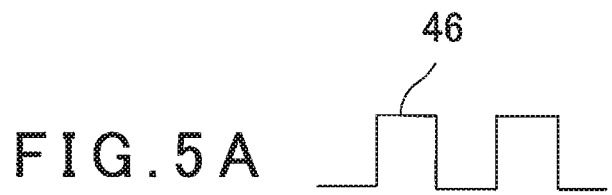
FIG. 5A is a drawing of a signal waveform in a case where an output signal from an encoder is converted to a rectangular wave.
Figure 5B:
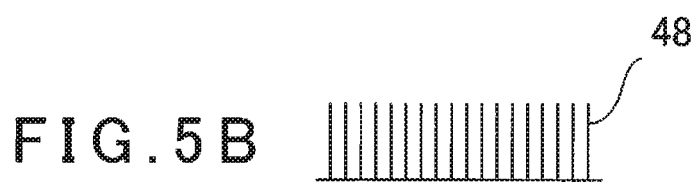
FIG. 5B is a drawing of a signal waveform of a clock signal.

FIG. 5A shows a rectangular wave which is obtained by converting a signal of sine shaped wave as outputted from the detecting component 16, and the rectangular wave is to be the angle signal 46. FIG. 5B shows a signal column of the clock signal 48. It is to be noted that one cycle of the rectangular wave corresponds to one cycle of the sine shaped wave signal.

Figure 6:
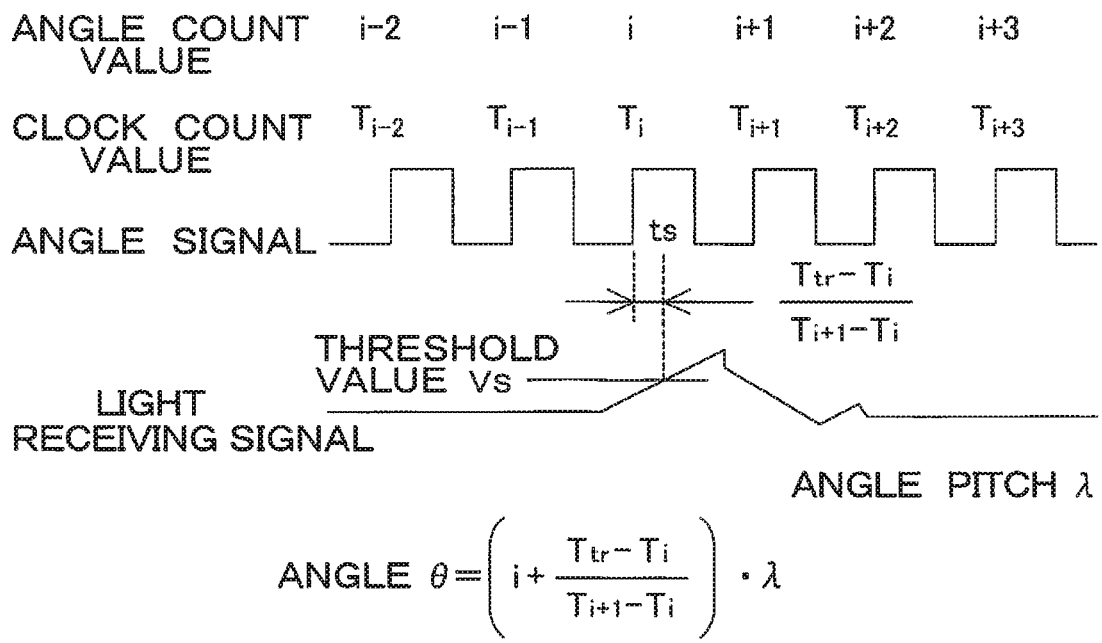
FIG. 6 is an explanatory drawing to show a relation among an angle signal, a clock signal and a trigger signal.

Further, FIG. 6 shows an association between the angle signal 46 and the clock signal 48. It is to be noted that the clock signal 48 is not shown in FIG. 6. Further, each of the angle signal 46, the clock signal 48 and the light receiving detecting signal 49 is counted at a leading edge of the signal.

The association between the angle signal 46 and the clock signal 48 can be determined, e.g., by defining the clock signal 48, which is coincident with i-th angle signal 46 as Ti-th when a counting number of the angle signal 46, is at i-th order. Here, the sign T represents a number of clock signals which are issued during a time interval of T=an angle signal 46. Therefore, in a case where the angle signal 46 is issued at i-th order, the clock signal means a signal which is issued at Ti-th order.

Based on an angle count value and a clock count value, a vertical angle at the moment when a reflected distance measuring light is received is obtained.

Judgment of the moment when the reflected distance measuring light is received is the moment "ts" when a light receiving signal exceeds a threshold value Vs. Further, as described above, the threshold value Vs is set to an optimal value which corresponds to a light receiving intensity.

In FIG. 6, if it is supposed that "ts" is issued between i-th order and (i+1)-th order of the angle signal 46 (i.e. if it is supposed that "ts" is issued in the middle of one cycle of i-th angle signal 46) (i.e. the last angle signal to be counted)), an angle θ at the moment, when "ts" is issued, is determined by obtaining the number of clock signals which correspond to a time duration at the time of exceeding a i-th angle signal 46, and by proportionally dividing an angle pitch of the angle signal 46 based on the number of clock signals. That is, the angle θ can be obtained as follows:

$$\theta = [i + (T_{tr} - T_i)/(T_{i+1} - T_i)] \times \lambda$$

Here, λ is an angle for one pitch of the angle signal 46, i.e., 360°/1000 according to an example as described above, and (i×λ) is a main angle as obtained by the angle signal 46, and $[(T_{tr}-T_i)/(T_{i+1}-T_1)] \times \lambda$ is an odd number angle which exceeds the last angle signal 46 as counted.

Then, a pulsed light is irradiated, a distance to an object to be measured is obtained, pulsed light irradiating direction is measured and three-dimensional data of the object to be measured is acquired.

Thus, in the present embodiment, a threshold value of detecting light receiving of a distance measuring light is changed corresponding to a light receiving intensity, hence even under a measuring circumstance where a property of a reflection surface of an object to be measured is changed extensively, a reflected distance measuring light can be surely received, further, noise is decreased by setting an appropriate threshold value and measurement accuracy is improved.

Furthermore, in the present embodiment, a rotation angle detection can be performed with high accuracy by simple processing of only counting a pulsed signal without performing a complicated signal processing. Further, since the present invention does not use a method of obtaining a phase from a plurality of waveforms, a high accuracy can be maintained without being influenced of a deterioration of waveforms in a case where speed becomes higher.

The invention claimed is:

1. A laser scanner comprising;
a light projecting unit for pulse-emitting a distance measuring light and for irradiating the distance measuring light,
a light receiving unit for receiving a reflected distance measuring light and for producing a light receiving signal, a distance measuring unit for performing a distance measurement based on a light receiving signal from said light receiving unit,
a rotary deflecting unit for deflecting said distance measuring light in a horizontal direction and for being rotated in a horizontal direction and in a vertical direction at a constant speed and for performing a rotary irradiation of said distance measuring light,
encoders for detecting a rotation angle of said rotary deflecting unit, and an arithmetic control unit for controlling said distance measuring unit and said rotary deflecting unit, for scanning said distance measuring light and for calculating three-dimensional data of a measuring point based on a light receiving signal from said light receiving unit,
wherein said arithmetic control unit has a light receiving intensity judging component and a threshold value setting component, a peak value of a light receiving intensity, which is obtained by scanning said distance measuring light in a measurement range as set in advance, is inputted to said threshold value setting component from said light receiving intensity judging component, said threshold value setting component sets a threshold value for detecting light receiving as associated with said measurement range corresponding to the peak value of said light receiving intensity, and said arithmetic control unit acquires a light receiving signal based on said threshold value and performs a distance measurement.

2. A laser scanner according to claim 1, further comprising encoders for detecting a rotation angle and a reference position of said rotary deflecting unit, a signal processing component for converting a signal from said encoder to an angle signal of a rectangular wave and a reference signal, a clock signal generating component for issuing a clock signal, an angle counter for counting said rectangular wave from said reference signal and a clock counter for counting said clock signal, wherein an angle calculating component counts said rectangular wave and said clock signal respectively with reference to said reference signal, obtains a count number of said rectangular wave at a moment when a light receiving intensity of said reflected distance measuring light exceeds said threshold value and obtains a number of clock signal exceeding the last rectangular wave as counted, obtains a main angle by multiplying an angle pitch of said rectangular wave and a count number of said rectangular waves together, obtains an odd number angle by proportionally dividing said angle pitch based on the number of said clock signal and obtains a rotation angle of said rotary deflecting unit by adding said main angle and said odd number angle.

* * * * *